(12) United States Patent
Yamashita (10) Patent No.: US 6,975,646 B2
(45) Date of Patent: Dec. 13, 2005

(54) NETWORK INTERCONNECTION SYSTEM (75) Inventor: Atsuya Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 958 days.

(21) Appl. No.: 09/796,674

(22) Filed: Mar. 2, 2001

(65) Prior Publication Data
US 2001/0040890 A1   Nov. 15, 2001

(30) Foreign Application Priority Data

Mar. 2, 2000   (JP)   ............................ 2000-057353

(51) Int. Cl.[7] .............................................. H04J 3/22
(52) U.S. Cl. ...................... 370/466; 370/401; 370/389; 370/474; 370/395.53
(58) Field of Search ................................ 370/386, 389, 370/392, 401, 395.5, 465, 466, 419, 474, 370/395.53; 709/230, 236, 237, 238, 246, 709/249

(56) References Cited

U.S. PATENT DOCUMENTS

| | | | | |
|---|---|---|---|---|
| 5,400,337 A | * | 3/1995 | Munter | 370/399 |
| 5,673,254 A | * | 9/1997 | Crayford | 370/231 |
| 5,732,071 A | * | 3/1998 | Saito et al. | 370/255 |
| 6,061,356 A | * | 5/2000 | Terry | 370/401 |
| 6,064,674 A | * | 5/2000 | Doidge et al. | 370/398 |
| 6,188,689 B1 | * | 2/2001 | Katsube et al. | 370/389 |
| 6,249,528 B1 | * | 6/2001 | Kothary | 370/466 |
| 6,252,888 B1 | * | 6/2001 | Fite et al. | 370/466 |
| 6,304,650 B1 | * | 10/2001 | Takeshita | 379/219 |
| 6,574,238 B1 | * | 6/2003 | Thrysoe | 370/466 |
| 6,618,366 B1 | * | 9/2003 | Furukawa et al. | 370/338 |
| 6,639,917 B1 | * | 10/2003 | Ellington et al. | 370/401 |
| 6,704,364 B1 | * | 3/2004 | Lim et al. | 375/257 |

* cited by examiner

Primary Examiner—Steven Nguyen
Assistant Examiner—Clemence Han
(74) Attorney, Agent, or Firm—Young & Thompson

(57) ABSTRACT

A network interconnection system has a plurality of input and output ports that are connected to different networks. An input interface connected to each of the input ports converts the input signal to an LCH packet signal when an input signal is not a MAC frame. A form of the LCH packet signal is identical to the MAC frame and a content of the LCH packet signal corresponding to a source address field of the MAC frame is set to all 0, which is inhibited in the MAC frame format. An output interface connected to each of the output ports converts the LCH packet signal to a signal conforming to a corresponding network when receiving an LCH packet signal as an output signal.

6 Claims, 7 Drawing Sheets

| 232 | 233 | 225 | 226 | 231A | 227 | 228 |
|---|---|---|---|---|---|---|
| LCH ADDRESS | All '0' | LENGTH | LLC/SNAP | | DATA | FSC |
| 48BITS | 48BITS | 16BITS | 64BITS | | 38BYTES TO 1492BYTES | 32BITS |
| | | | AA(h)+AA(h)+03(h)+000000(h)+0800(h) | | | CRC CODE |

FIG. 11

| 232 | 233 | 401 | 231B | 227A | 228 |
|---|---|---|---|---|---|
| LCH ADDRESS | All '0' | TYPE | | DATA | FSC |
| 48BITS | 48BITS | 16BITS | | 46BYTES TO 1500BYTES | 32BITS |
| | | 0800(h) | | | CRC CODE |

FIG. 12

| 232 | 411 | 401 | 231C | 227A | 228 |
|---|---|---|---|---|---|
| LCH ADDRESS | SPECIFIC MAC | TYPE | | DATA | FSC |
| 48BITS | 48BITS | 16BITS | | 46BYTES TO 1500BYTES | 32BITS |
| | | 0800(h) | | | CRC CODE |

NETWORK INTERCONNECTION SYSTEM

BACKGROUND OF THE INVENTION

1. Field of the Invention

The present invention relates to a network interconnection system for connecting various kinds of networks.

2. Description of the Related Art

There have been various communication networks based on their own individual technical backgrounds, such as a network that connects general telephone sets, a network that connects portable telephones or computers. In these networks, communications are being carried out based on their own standards and their own signal formats (protocols). For example, voice signals are transmitted in the network that connects general telephones. Further, in a LAN (local area network), packet signals having various formats may be transferred. It is not possible to mutually connect these networks and to freely transmit information across these different kinds of networks.

In recent years, demand for connection of these networks has been growing from the viewpoint of the expansion of network infrastructure, cost reduction, and effective utilization of past assets. In order to meet this request, there have been proposed systems for converting signals that are transmitted across these networks.

Figure 1A:
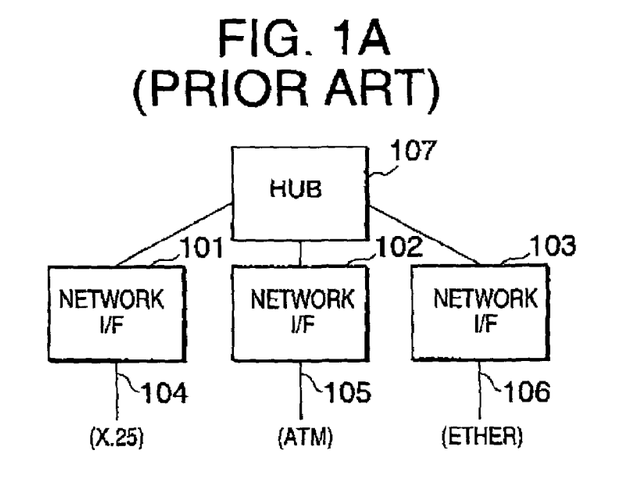
FIG. 1A is a block diagram showing a circuit configuration of a conventional network interconnection system.

FIG. 1A shows a conventional network interconnection system. In FIG. 1A, network interfaces (I/Fs) 101–103 are connected to the following network, respectively: X.25 network 104 on which X.25 packets are transferred; ATM network 105 on which ATM (asynchronous transfer mode) packets (or cells) are transferred; and Ethernet network 106 on which Ethernet packets are transferred. Further, these network interfaces 101–103 are also connected to a hub HUB 107. Ethernet represents a typical product name of a LAN that has been developed mainly by Xerox.

Figure 1B:
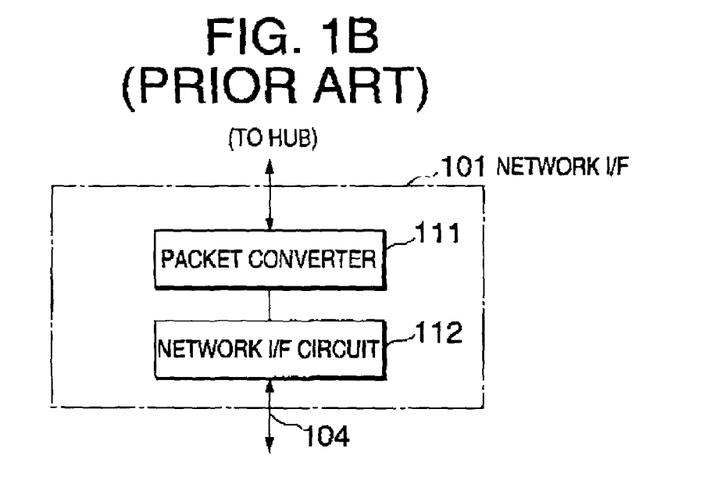
FIG. 1B is a block diagram showing a circuit configuration of a network interface circuit in the conventional network interconnection system.

FIG. 1B shows an internal structure of the network interface 101. The other network interfaces 102 and 103 also have basically the same structure as that of the network interface 101, and therefore, their explanation will be omitted here. The network interface 101 has a packet converter 111 that is connected to the HUB 107 as shown in FIG. 1A, and a network interface circuit 112 that is connected to the other end of this packet converter 111 and is also connected to the X.25 network 104.

In this conventional network interconnection system, an X.25 packet that has been received from the X.25 network 104, for example, is input to the packet converter 111 via the network interface circuit 112. In the packet converter 111, the X.25 packet is converted into a specific packet (hereinafter to be referred to as a common packet) that is common to these networks. In the case of transfer of the data conveyed in the common packet to the ATM network 105, the common packet obtained by conversion from the X.25 packet is transmitted to the network interface 102 via the HUB 107. The network interface 102 has a packet converter similar to the packet converter 111 as shown in FIG. 1B. However, the packet converter of the network interface 102 is different from that of the network interface 101 in that a conversion is performed between a common packet and an ATM cell. ATM cells obtained by conversion in the packet converter of the network interface 102 are transmitted to the ATM network 105 via the network interface circuit within the network interface 102. The data conversion between the X.25 network 104 and the Ethernet network 106 and the data conversion between the ATM network 105 and the Ethernet network 106 are carried out in a similar manner.

However, in such a conventional system configuration as shown in FIGS. 1A and 1B, each time a new standard or a new signal format is employed, an interface and a processor supporting these new one become necessary. Therefore, such a conventional system has a problem of lack in extensibility as a hardware function. To cope with this situation, there have been proposed methods of controlling a compound switching system that can accommodate various terminals of different signal formats. According to a proposal disclosed in Japanese Patent Application Unexamined Publication No. 58-151748, data transmitted from a subscriber terminal is converted into a uniquely defined packet that is used in a packet network within the switching system.

Figure 1C:
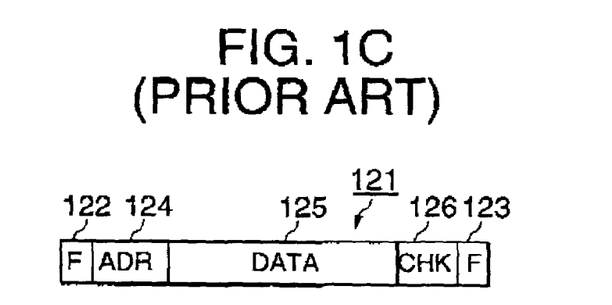
FIG. 1C is a diagram showing a packet format used in the conventional network interconnection system.

FIG. 1C shows a format of a uniquely defined packet that is used in the packet network within the switching system. A packet 121 has flags 122 and 123 at the front edge and the rear edge thereof, that are similar to in the HDLC (high-level data link control) procedure. The packet 121 also has an source and destination address field (ADR) 124, an information field (DATA) 125, and an error correcting code field (CHK) 126. The source and destination address field (ADR) 124 includes a source address and a destination address. The information field 125 includes the contents of a transmitted signal. Based on one common format for signals handled within the switching system as shown in FIG. 1C, it is possible to simplify the signal processing when data having various signal formats have been taken into the switching system, without the need of preparing different hardware for each signal format. In other words, it is possible to guarantee the extensibility of the hardware function.

According to Japanese Patent Application Unexamined Publication No. H9-233122, there has been disclosed an inter-LAN connection router for connecting LANs via an ISDN (Integrated Services Digital Network) network. Based on the conventional technique, protocol-type packets having a specific signal format set in advance by a user are transferred by a D-channel packet switching and other packets are transferred by a B-channel packet switching, resulting in efficient data communications.

As described above, there have conventionally been techniques for converting data into a specific-format data packet that can be handled in common within the switching system. Contrarily, for transmitting these signals to networks outside tho switching system, the signals are converted again into signal formats corresponding to the outside networks, and then the converted signals are transmitted.

In recent years, data communications between computers have increased rapidly with the widespread of LANs and the Internet. Under this situation, there has been a possibility that a major portion of various information taken into the switching system and transmitted to the networks is data to be used by other computers via the LANs and the Internet. As a representative type of this data, there is data based on a MAC (media access control) frame used in a MAC layer. The MAC layer is a lower sub-layer of the data link layer, which is composed of an LLC (logic link control) layer as a upper sub-layer and the MAC layer as a lower sub-layer.

According to the above-described conventional techniques, however, an input signal is converted into a signal format that is used in common within the switching system. This signal format is not determined taking into consideration a network at the output side (transmission side) of the switching system. Accordingly, it is necessary to make substantial changes in signal format at both times of taking a signal into the switching system and transmitting a signal to outside. This results in a complicated signal conversion processing.

SUMMARY OF THE INVENTION

It is an object of the present invention to provide a network interconnection system allowing simplified processing of signal conversion.

According to the present invention, there is provided a network interconnection system including: a plurality of input and output ports that are connected to different networks; an input interface connected to each of the input ports, wherein, when an input signal is not a signal of a predetermined signal format, the input interface converts the input signal to an interim packet signal, wherein a form of the interim packet signal is identical to the predetermined signal format and a content of a predetermined portion of the interim packet signal is different from a counterpart of any packet signal of the predetermined signal format: an output interface connected to each of the output ports, wherein, when receiving an Interim packet signal as an output signal, the output interface converts the interim packet signal to a signal conforming to a corresponding network; and a switch for forwarding an interim packet signal received from one of input interfaces to an appropriate one of output interfaces based on a destination of an original signal of the received interim packet signal.

A signal of the predetermined signal format may be widely used in a computer network. The signal of the predetermined signal format may be an Ethernet packet signal. The predetermined portion of the interim packet signal corresponding to a source address of the Ethernet packet signal may be set to a unique bit string that is not used in Ethernet packet format. The predetermined portion of the interim packet signal corresponding to a source address of the Ethernet packet signal may be set to all 0s. The predetermined portion of the interim packet signal corresponding to a source address of the Ethernet packet signal may be set to a unique bit string in a world-wide computer network.

According to another aspect of the present invention, a network interconnection system includes: a plurality of input/output ports that are connected to outside networks, respectively; a network interface port connected to each of the input/output ports; a packet converter connected to the network interface port; and a hub connecting packet converters corresponding to respective ones of the input/output ports. The network interface port includes: a packet memory for storing an input packet signal received from a corresponding input/output port; and a first determiner for determining whether the input packet signal is an MAC (media access control) frame signal, to output a determination result and the input packet signal to the packet converter. The packet converter includes: a LCH header generator for generating a local channel header when it is determined that the input packet signal is not the MAC frame signal; a LCH packet combiner for combining the local channel header and the input packet signal to produce a local channel packet signal to be sent to the hub, wherein a form of the local channel packet signal is identical to the MAC frame signal and a content of a predetermined portion of the local channel packet signal is different from a counterpart of any MAC frame signal; a second determiner for determining whether an output packet signal is a local channel packet signal; and a local packet checker for reproducing a packet signal conforming to a corresponding network from the output packet signal when the output packet signal is a local channel packet signal, wherein, when the output packet signal is an MAC frame signal, the output packet signal is output as it is to the corresponding network.

According to still another aspect of the present invention, a method for connecting a plurality of networks to each other through a switch having a plurality of input and output ports, includes the steps of: storing an input packet signal received from an input port corresponding to a network; determining whether the input packet signal is an MAC (media access control) frame signal; when it is determined that the input packet signal is not an MAC frame signal, generating a local channel header based on a destination of the input packet signal; combining the local channel header and the input packet signal to produce a local channel packet signal, wherein a form of the local channel packet signal is identical to the MAC frame signal and a content of a predetermined portion of the local channel packet signal is different from a counterpart of any MAC frame signal; forwarding the local channel packet signal to a destination output port; and when it is determined that the input packet signal is an MAC frame signal, forwarding the input packet signal as it is to a destination output port.

The method may further include the steps of: determining whether an output packet signal is a local channel packet signal; when the output packet signal is a local channel packet signal, reproducing a packet signal conforming to a corresponding network from the output packet signal; and when the output packet signal is an MAC frame signal, outputting the output packet signal as it is to the corresponding network.

In the light of the fact that data communications based on the LANs and the Internet have been increasing in recent years, the network interconnection system according to the present invention can dramatically simplify the conversion processing of signal format taking into consideration a signal format widely used in a computer network. As examples of networks to be connected, there are Ethernet lines, ATM lines, and X.25 packet lines. The network interconnection system of the present invention sets the signal formats used in such networks to a specific signal format in advance. With this arrangement, the network interconnection system makes it unnecessary to convert the signal format of an input signal when this input signal has this specific signal format.

Further, when a signal having other signal format has been input, the network interconnection system minimizes the singal format conversion load. As a result, it becomes possible to decrease the load of the software and the hardware. Further, it becomes possible to guarantee the extensibility of the hardware by using the specific signal format that is used only within the network interconnection system.

The network interconnection system of the present invention can be so structured that the use of a signal that has a signal format closely analogous to a preset specific signal format and that is used only within the network interconnection system is prohibited in the network outside the network interconnection system. Based on this arrangement, it is possible to guarantee the extensibility of the hardware.

DESCRIPTION OF THE PREFERRED EMBODIMENTS

Figure 2:
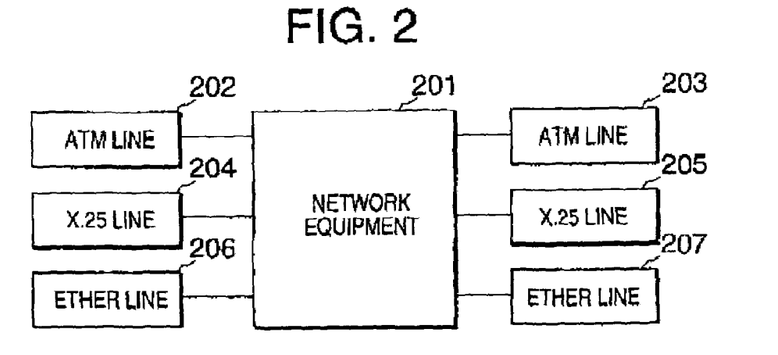
FIG. 2 is a schematic diagram showing an outline structure of network equipment employing a network interconnection system according to the present invention.

Referring to FIG. 2, network equipment 201 connects ATM lines 202 and 203, X.25 lines 204 and 205, and Ethernet lines 206 and 207 and performs switching while converting a signal format between them. Here, assuming the case of connecting three kinds of lines to simplify the explanation, the connection of lines is not limited to this example. For example, it is of course possible to connect telephone lines to the network equipment 201.

Figure 3:
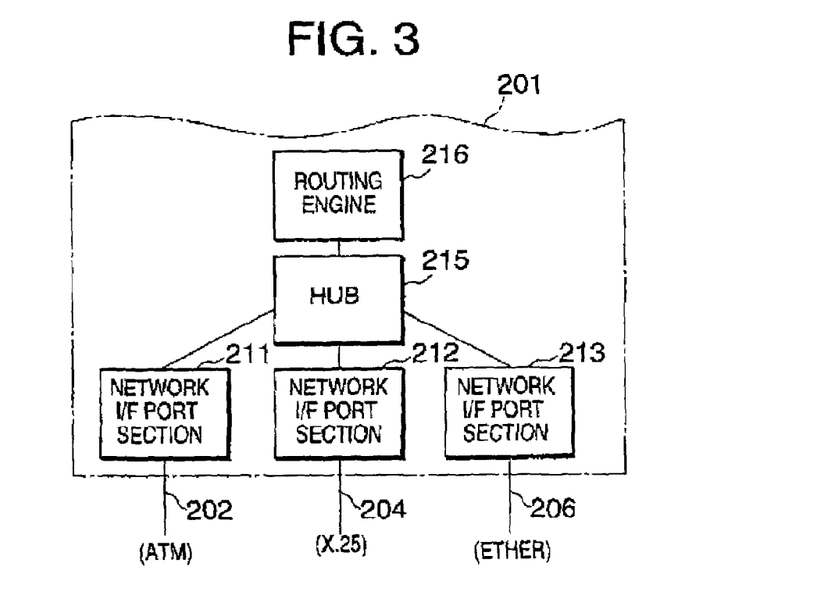
FIG. 3 is a block diagram showing a network interconnection system according to an embodiment of the present invention.

As shown in FIG. 3, the network equipment 201 includes first to third network interface (I/F) port sections 211 to 213 that are connected to the ATM line 202, the X.25 line 204, and the Ethernet line 206, respectively. The network interface port sections 211–213 are connected to a hub 215 as a relay point, and the hub 215 is connected to a routing engine (RE) 216. Although not shown in FIG. 3, a packet converter is included in the network equipment 201 as described later.

Figure 4:
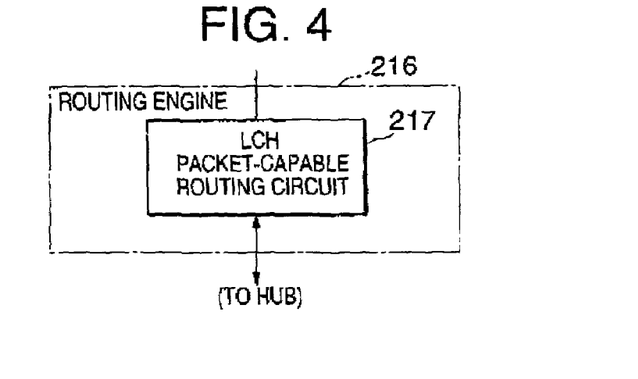
FIG. 4 is a block diagram showing a routing engine in the present embodiment.

FIG. 4 shows an outline of the routing engine (RE) 216. The routing engine 216 has a routing circuit 217 for performing a routing operation of a packet called an LCH (local channel) packet. As described later, an LCH packet is a packet that is extremely similar to an MAC frame of the Ethernet but can be discriminated from the MAC frame. The LCH packet is provided according to the present invention. The routing engine 216 is designed to select a route of an input packet and edit the header of the packet depending on the selected route. The routing engine itself is a known technique, and therefore, a detailed explanation of this will be omitted here.

LCH Packet

Figure 5A:
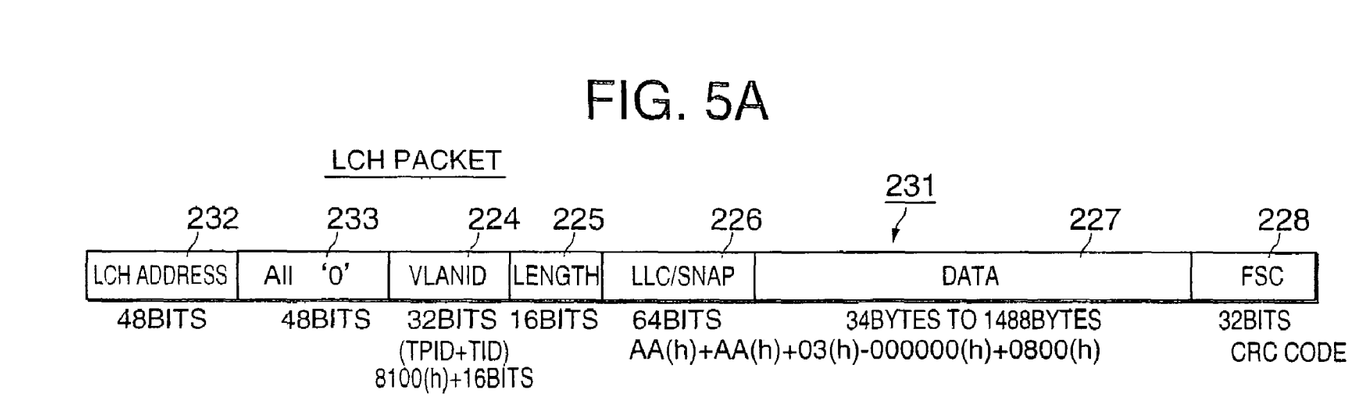
FIG. 5A is a diagram showing a format of an LCH packet used in the present embodiment.
Figure 5B:
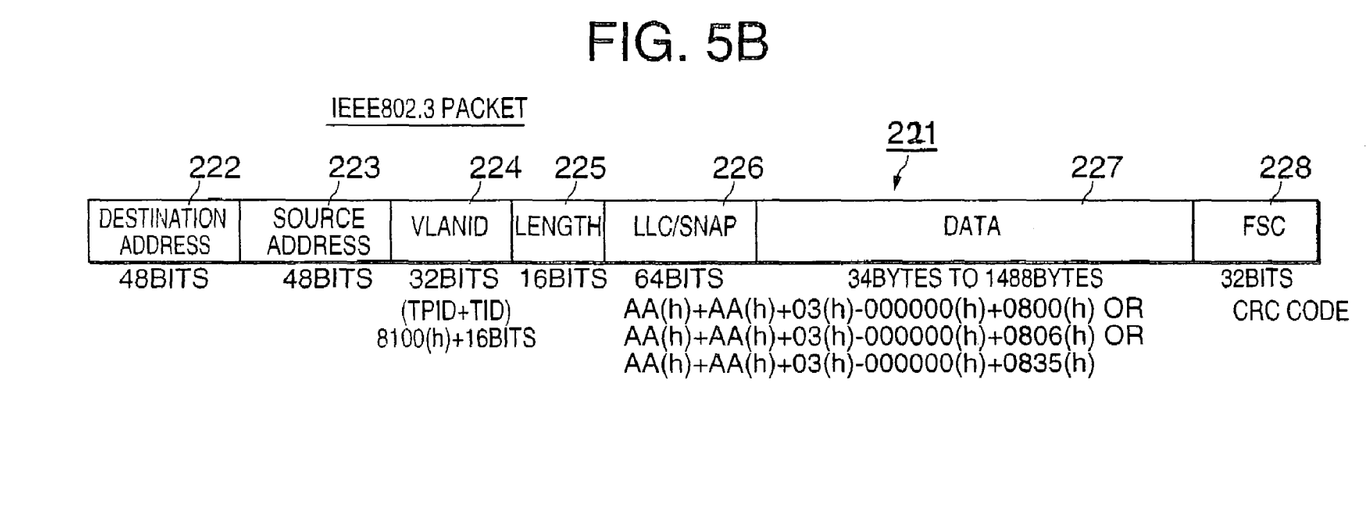
FIG. 5B is a diagram showing a format of an IEEE802.3 packet.

FIG. 5A shows an LCH packet in the present embodiment and FIG. 5B shows a MAC frame of the Ethernet (IEEE802.3) for comparison.

As shown in FIG. 5B, a MAC frame 221 of the Ethernet is defined as an IEEE802.3 packet and is composed of a 48-bit destination address field 222, a 48-bit source address field 223, a 32-bit VLAN (virtual LAN) ID field 224, a 16-bit length field 225 for defining a length of storing data up to 105K bytes, a 64-bit LLC/SNAP identification field 226, a packet data field 227 having an adjustable data length within a range from 34 bytes to 1,488 bytes, and a 32-bit FCS (frame check sequence) field 228 as a CRC (cyclic redundancy check) code. The VLANID field 224 stores an identifier used to realize a plurality of virtual LANs on a single LAN.

An LCH packet 231 as shown in FIG. 5A is closely analogous to the MAC frame 221, which is different from the MAC frame 221 in only the 48-bit destination address 222 and the 48-bit source address 223 of the MAC frame 221. More specifically, in the LCH packet 231, a 48-bit LCH address field 232 is disposed instead of the 48-bit destination address field 222 of the MAC frame 221. Further, in the LCH packet 231, a 48-bit all-0 bit field 233 is disposed instead of the 48-bit source address field 223.

In the case of the MAC frame 221, all zero bits are inhibited for the 48-bit source address 223 except for the special situation of an occurrence of a fault. In other words, the use of a MAC frame 221 having intentionally disposed such an all-0 bit signal has been prohibited. Therefore, when this signal portion consists of all zero "000 . . . 0", it is determined that this packet is an LCH packet 231 and not a MAC frame 221.

In the LCH packet 231 of the present embodiment, the 48-bit LCH address 232 includes a destination address and a source address in a suitable structure while storing only "0" in the portion (all-0 bit field 233) corresponding to the source address field 223 of the MAC frame 221. As described above, such a LCH packet is prohibited on the Ethernet. However, since the LCH packet 231 is transferred only within the network equipment, there is developed no problem on the external network.

As described above, the form of the LCH packet 231 is substantially identical to that of the MAC frame 221. Therefore, it cannot be determined which one of the LCH packet 231 and the IEEE802.3 packet the received packet is without checking a content of the second 48-bit field (source address for MAC frame and all-0 bits for LCH packet) thereof.

Therefore, a HUB LSI (large-scale integrated circuit) for use in packet transmission on the existing Ethernet can be also used as the HUB 215. Further, a routing engine LSI for use in the packet transmission on the existing Ethernet can also be used as the routing engine (RE) 216.

Furthermore, in the network equipment according to the present embodiment, it is possible to discriminate between an LCH packet 231 and an MAC frame 221 as the packet on the Ethernet because the LCH packet has all-0 bits stored in the all-0 field 233 that is inhibited in the case of the MAC frame 221.

In this manner, it is not necessary to convert the signal format of the MAC frame 221 in the network equipment of the present embodiment, allowing LCH packets and Ethernet packets to be mixed in the network equipment. This means that it is possible to reduce in conversion loss and the load of the hardware.

Network I/F Port

Figure 6:
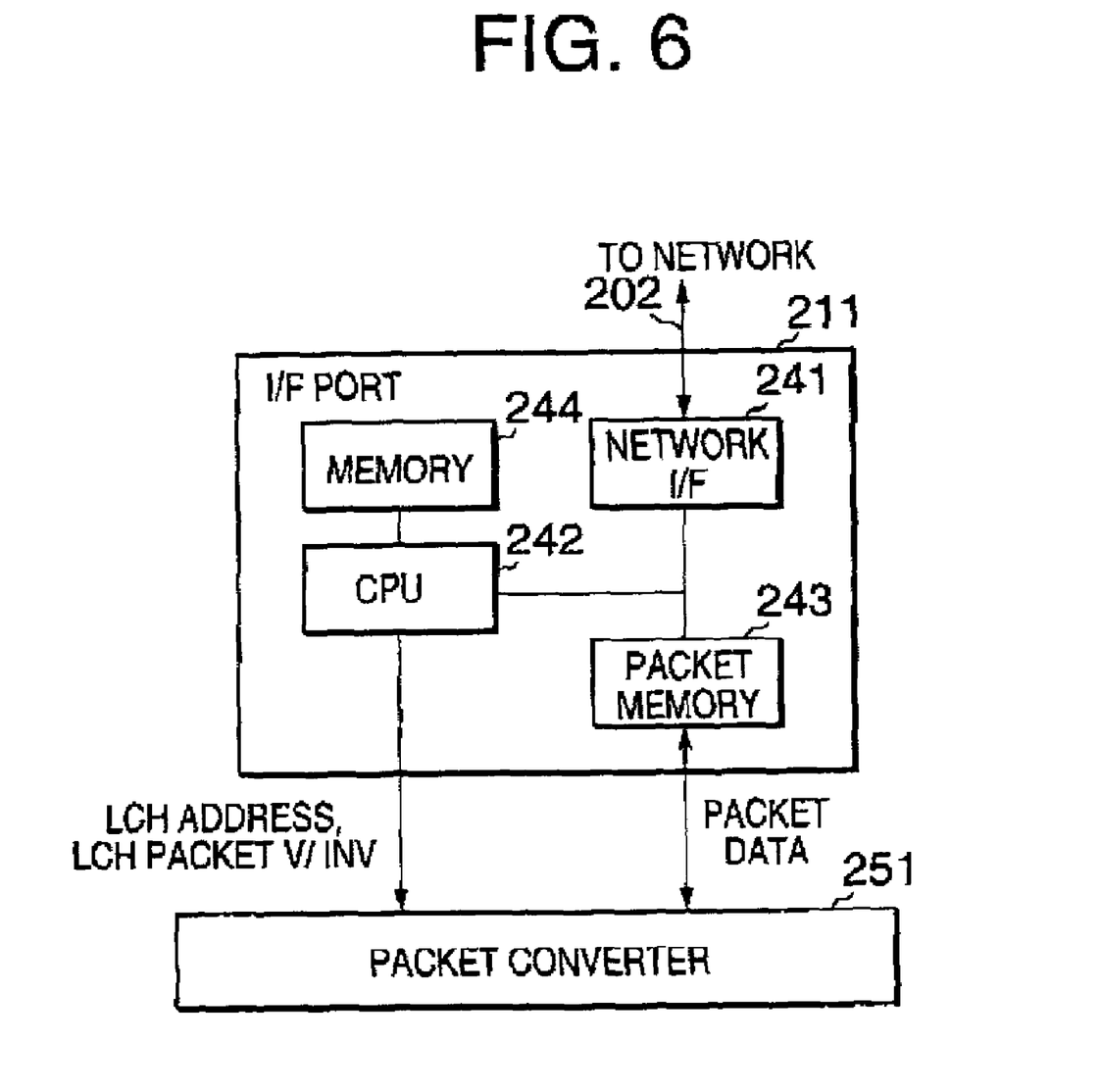
FIG. 6 is a block diagram showing the circuit of a network interface port in the embodiment.

Referring to FIG. 6, the network interface port section 211 is composed of a network interface circuit 241 connected to the corresponding ATM line 202, a CPU (central processing unit) 242 connected to the network interface circuit 241, a packet memory 243, and a memory 244 attached to the CPU 242. The CPU 242 controls various components according to a control program stored in the memory 244.

Although FIG. 6 shows the network interface port 211, other network interface ports 212 and 213 also have a similar circuit configuration. The network interface circuit 241 of each network interface port has its own circuit structure depending on a signal format employed in a corresponding network. Hereinafter, taking the network interface port 211 as an example, the circuit structure and operation of a network interface port section will be described in detail.

As shown in FIG. 6, an ATM cell received from the ATM line 202 is input to the network interface circuit 241, and is then stored in the packet memory 243. At the same time, the CPU 242 starts the program stored in the memory 244, and checks the destination information and the like of the cell stored in the packet memory 243. For example, the destination information may determine as an output port the other ATM line 203 or the Ethernet line 207 (see FIG. 2).

The CPU 242 determines an identifier identifying a source interface port and a destination interface port within the network equipment 201 depending on the destination information. Further, the CPU 242 determines an 48-bit LCH address 232. As described above, the LCH address 232 includes information on a destination address and a source address, and this LCH address 232 can be structured arbitrarily because it is valid only in the network equipment 201. The CPU 242 notifies a result (valid/invalid) of a decision made on whether a packet should be converted into the LCH packet 231 or not (that is, whether the packet is a predetermined specific signal format or not) and a determined LCH address to a packet converter 251. Further, the packet data stored in the packet memory 243 is output to the packet converter 251.

On the other hand, when a packet is input from the other network interface port to the first network interface port 211 via the packet converter 251, this packet is transmitted from the network interface circuit 241 to the ATM line 202 as ATM cells. In general, the network interface ports 211–213 allow data transmission to other networks such as the X.25 line based on the different setting of the network interface circuit 241 and the control program including LCH algorithm stored in the memory 244 for each signal format.

Packet Converter

Figure 7:
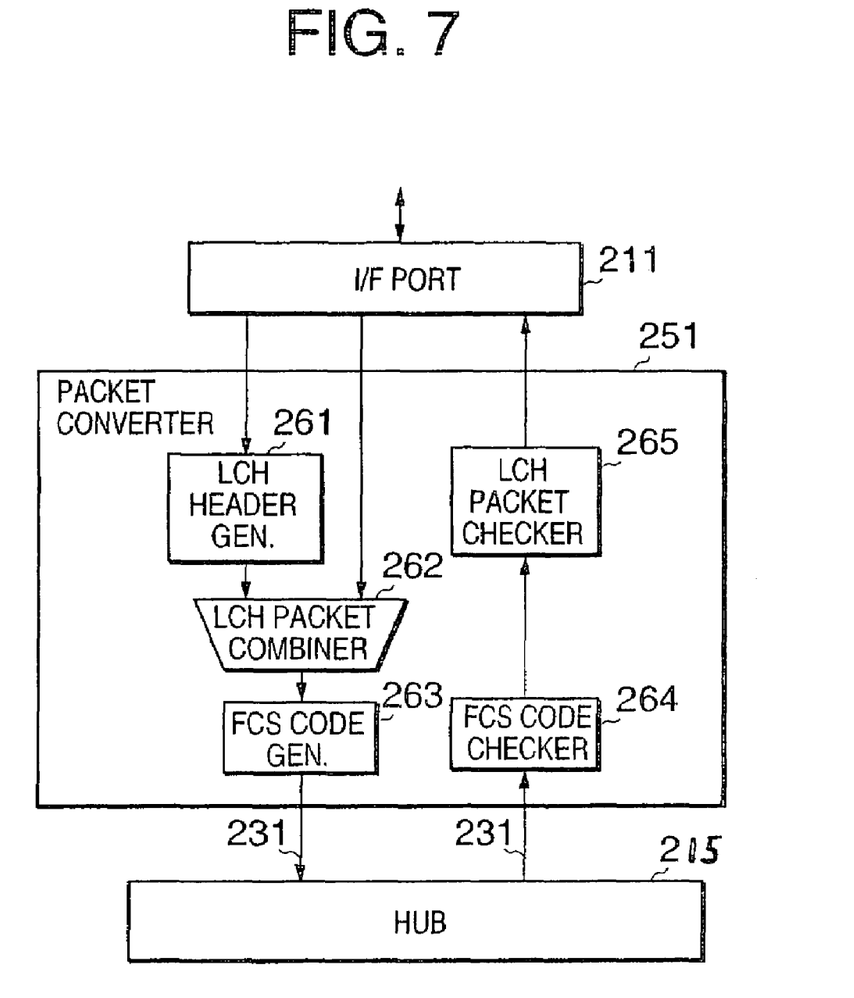
FIG. 7 is a block diagram showing the circuit of a packet converter in the present embodiment.

Referring to FIG. 7, the packet converter 251 is connected between the first network interface port 211 and the HUB 215 as shown in FIG. 3. Other packet converters are provided corresponding to respective ones of the network interface ports 212 and 213. Here, the packet converter 251 connected to the first network interface port 211 will be described as an example. It is basically the same with the other packet converters.

The packet converter 251 performs a bi-directional operation from the interface port 211 of the ATM line 202 to another network and from another network to the interface port 211. The packet converter 251 includes an LCH header generator 261 for generating an LCH header based on an LCH address received from the CPU 242, an LCH packet combiner 262 for combining the generated LCH header and the ATM cell received from the packet memory 243 to produce the contents 232–227 (see FIG. 5A) of an LCH packet, and an FCS code generator 263 for generating the FCS code 228 based on the contents of the LCH packet and adding this FCS code 228 to produce an LCH packet 231. The LCH packet 231 is sent to the HUB 215. Further, the packet converter 251 includes an FCS code checker 264 for checking an FCS code of a received packet from the HUB 215, and an LCH packet checker 265 for checking whether the received packet is an LCH packet. If it is an LCH packet, then the LCH packet checker 265 reproduces an original packet from the LCH packet.

The case where a packet flows from the interface port 211 of the first network (ATM line 202) to another network will be described.

When the packet converter 251 has obtained the LCH address 232 from the CPU 242 of the first network interface port 211, the LCH address 232 is input to the LCH header generator 261. Then, the LCH header generator 261 generates the 48-bit LCH address 232, the 48-bit all-0 signal 233, the 32-bit VLAN ID 224, the 16-bit Length 225, and the 64-bit LLC/SNAP identification value 226 as shown in FIG. 5A and outputs them to the LCH packet combiner 262. The LCH packet combiner 262 receives the LCH header information from the LCH header generator 261 and the packet data of the ATM cell from the first network interface port 211 to combine them.

In some case, the value to be input to the VLANID field 224 may be received from the first network interface port 211. The combined LCH packet by the LCH packet combiner 262 is output to the FCS code generator 263, and the CRC cyclic code FCS 228 is added to the tail of the combined LCH packet to produce an LCH packet 231. The LCH packet 231 generated in this way is sent to the HUB 215.

In the case where an MAC frame has been input to a corresponding packet converter 251, unlike the above-described procedure, the LCH header generator 261 does not generate any header, and sends the MAC frame as it is to the LCH packet combiner 262 without changing in the signal format. Then, the FCS code generator 263 adds a CRC cyclic code 228 to the tail of the MAC frame (see FIG. 5B) and sends it to the HUB 215.

As described above, according to the present embodiment, when the MAC frame has been input to the packet converter, the signal format is not converted. With this arrangement, it is possible to decrease the load of the hardware and the software for converting the signal format.

In the case of a packet flowing in the direction opposite to that described above, the packet is received from the HUB 215 and is input to the FCS code checker 264. Then, it is determined whether the data of the received packet has been destroyed or not. When the received packet has been destroyed, that packet is discarded. When the received packet has not been broken, this packet is input to the LCH packet checker 265. The LCH packet checker 265 checks this packet to see whether the field after 48 bits from the head position has a consecutive sequence of 48 bits of "0" or not. When the corresponding field stores the consecutive 0s for 48 bits, the LCH packet checker 265 determines that this packet is an LCH packet 231 that is used in the present embodiment. Then, the LCH packet checker 265 transmits the data portion of the packet to the interface port of the destination network. When the corresponding field of the 48 bits is not all "0", it is determined that this packet is not the LCH packet that is used in the present embodiment, that is, it is an MAC frame such as IEEE802.3 packet or DIX-ETHER packet. When the packet is the MAC frame, the MAC frame is output as it is to the interface port in a similar manner to that of the opposite flow described above. In other words, in the case of the MAC frame, the MAC frame passes through the network equipment of the present embodiment in the signal format as it is, regardless of the direction of the flow in the packet converter 251. In the present embodiment, an MAC frame is set to a specific signal format that passes through the network equipment without the conversion of the signal format. Such a specific signal format is not limited to the MAC frame as exemplified in the present embodiment.

The HUB 215 receives packets from the network interface ports 211 to 213 via respective ones of the packet converters 251. In the case of a received packet being an LCH packet 231, it is determined which one of the network interface ports this LCH packet should be sent to, by looking at the LCH address 232 thereof. Then, the LCH packet 231 is transmitted based on this decision. In the case of the MAC frame 221, it is determined which one to the network interfaces this MAC frame should be transmitted to, by looking at the destination address 222. Then, this MAC frame 221 is transmitted based on this decision.

When it is not possible to determine a destination based on the algorithm of the CPU 242 of a corresponding network interface port, the packet is transferred to the routing engine 216 as shown in FIG. 3. The routing engine 216 determines a forwarding destination from known destinations based on the data inside the packet, reedits the packet destination information and the packet data itself, and sends it back to the HUB 215.

Figure 8:
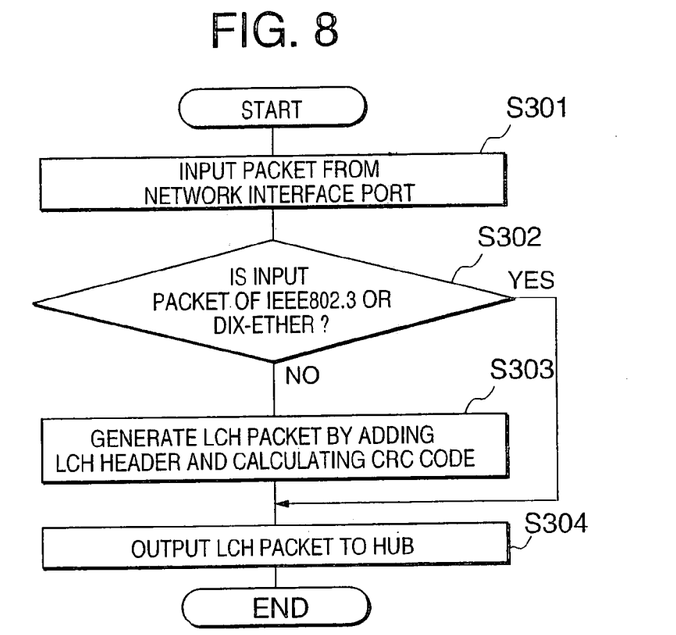
FIG. 8 is a flowchart showing a packet conversion operation from an input packet to an LCH packet in the present embodiment.

FIG. 8 shows an outline of the processing of packet conversion in the flow direction from the network to the HUB. When a packet has been input to the packet converter 251 from a network interface port (step S301), the packet converter 251 determines whether the input packet is the MAC frame (IEEE802.3 packet or DIX-ETHER packet) as shown in FIG. 5B or not (step S302). When the input packet is the MAC frame (YES at step S302), the packet converter 251 outputs this packet to the HUB 215 by keeping the signal format as it is. On the other hand, when the input packet is a signal having other signal format (NO at step S302), the packet converter 251 adds the header of an LCH packet to this packet, and adds the CRC cyclic code to the tail of the packet according to the same calculation as that used for the MAC frame, thereby generating an LCH packet 231 (step S303). Then, the packet converter 251 outputs this LCH packet 231 to the HUB 215 (step S304).

Figure 9:
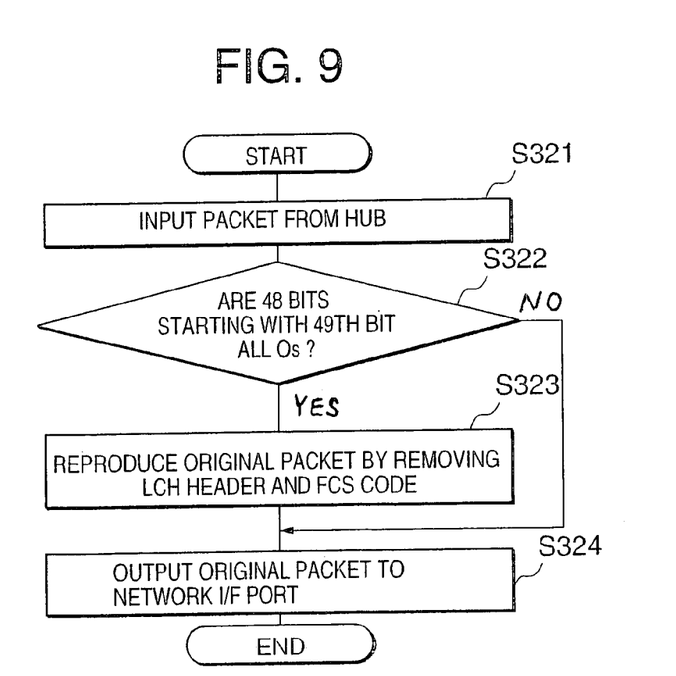
FIG. 9 is a flowchart showing a packet conversion operation from an LCH packet to an original packet in the present embodiment.

FIG. 9 is a flowchart showing an outline of the processing in the flow direction from the HUB 215 to the network interface port. Here, the FCS code checking operation is omitted. When a packet has been input from the HUB 215 to the LCH packet checker 265 (step S321), the LCH packet checker 265 reads the 48-bit data following the first 48-bit data of the packet, and determines whether the read 48 bits are all 0s (step S322). When these 48 bits are all 0s (YES at step S322), it is determined that this packet is not an MAC frame but an LCH packet. In this case, the LCH packet checker 265 reproduces an original packet by removing both the header portion and the CRC cyclic code at the tail from the LCH packet (step S323). The LCH packet checker 265 outputs the resultant original packet to the network interface port (step S324). When the 48 bits are not all 0s (NO at step S322), it is determined that the packet is the MAC frame. Then, the LCH packet checker 265 outputs this packet as it is to the interface port without converting the signal format.

First Modification

A modification of the LCH packet 231 will be described with reference to FIG. 10.

Figure 10:
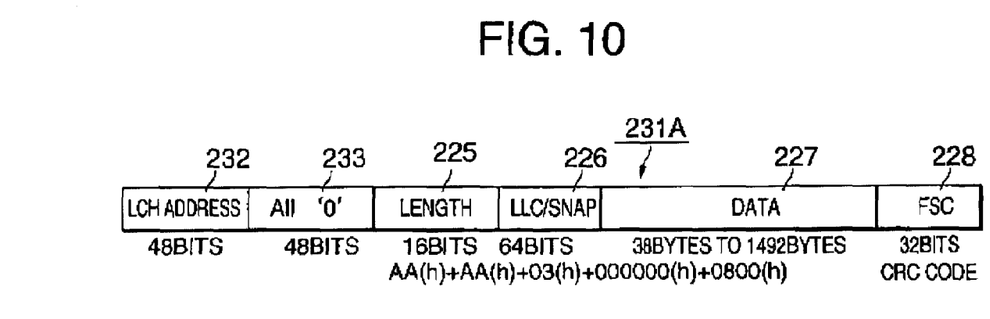
FIG. 10 is a diagram showing a first modification of an LCH packet used in the present embodiment.

As shown in FIG. 10, a LCH packet 231A has a format obtained by removing the 32-bit VLANID field 224 (see FIG. 5A) from a packet (MAC frame) of the IEEE802.3 format. The 48-bit LCH address 232 and the 48-bit all-0 data 233 exist in a similar manner to that of the LCH packet 231 as shown in FIG. 5A as a feature of the present invention.

Second Modification

Figure 11:
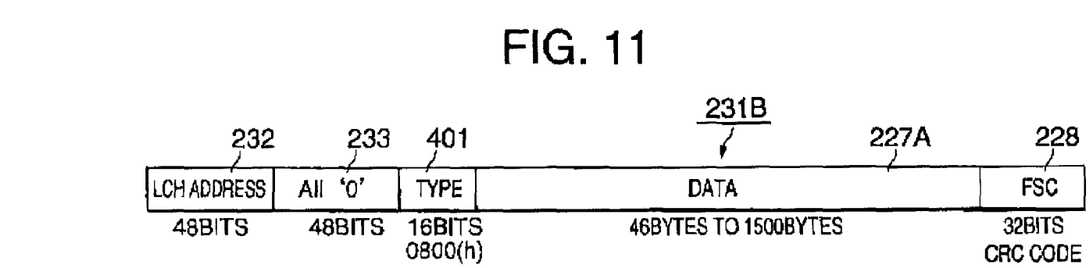
FIG. 11 is a diagram showing a second modification of an LCH packet used in the present embodiment.

As shown in FIG. 11, a LCH packet 231B is similar to an Ethernet packet. In the LCH packet 231B, there are disposed a type (TYPE) 401, and a variable-length packet data varying from 46 bytes to 1,500 bytes following the 48-bit LCH address 232, and the 48-bit all-0 data 233 as the feature of the present invention.

Third Modification

Figure 12:
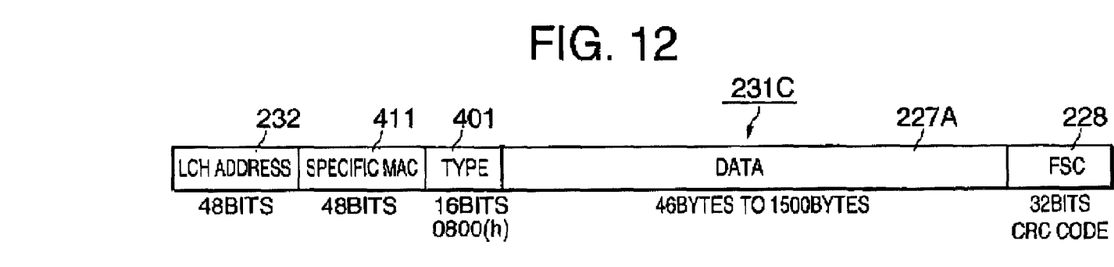
FIG. 12 is a diagram showing a third modification of an LCH packet used in the present embodiment.

As shown in FIG. 12, in an LCH packet 231C, a 48-bit specific MAC signal 411 consisting of a specific signal string is disposed at a position where the all-0 data 233 is disposed in the other modifications. This specific MAC signal 411 is a unique signal string that is not being used in any NIC (network information center) in the world as an organization for managing the IP address. Therefore, based on determining whether a signal is the specific MAC signal 411 or not, it is possible to determine that the signal is the LCH packet of the present invention or not. In the above first to third modifications, it is also possible obtain effects similar to those of the embodiment.

As described above, according to the present invention, when an input signal has a predetermined specific signal format, the input signal is output as it is to a destination network without carrying out a signal conversion. Therefore, it becomes possible to simplify the signal conversion processing, and it also becomes possible to decrease the load of the hardware and the software. When the input signal has a format other than the predetermined specific signal format, this signal is converted into a signal having a signal format extremely similar to the predetermined specific signal format but allowing it to discriminate from the signal having the predetermined specific signal format. Therefore, it is possible to make the processing within the network equipment common to the processing of the signal having the predetermined specific signal format. As a result, it becomes possible to make the hardware common, Further, it becomes possible to simplify the signal conversion processing and to minimize the load of the CPU.

What is claimed is:

1. A network interconnection system comprising:
   a plurality of input and output ports that are connected to different networks;
   an input interface connected to each of the input ports, wherein, when an input signal is not a signal of a predetermined signal format, the input interface converts the input signal to an interim packet signal, wherein a form of the interim packet signal is identical to the predetermined signal format and a content of a predetermined portion of the interim packet signal is different from a counterpart of any packet signal of the predetermined signal format;
   an output interface connected to each of the output ports, wherein, when receiving an interim packet signal as an output signal, the output interface converts the interim packet signal to a signal conforming to a corresponding network; and
   a switch for forwarding an interim packet signal received from one of input interfaces to an appropriate one of output interfaces based on a destination of an original signal of the received interim packet signal,
   wherein a signal of the predetermined signal format is an Ethernet packet signal, wherein the predetermined portion of the interim packet signal corresponding to a source address of the Ethernet packet signal is set to a unique bit string that is not used in Ethernet packet format.

2. The network interconnection system according to claim 1, wherein the predetermined portion of the interim packet signal corresponding to a source address of the Ethernet packet signal is set to all 0s.

3. A network interconnection system comprising:
a plurality of input/output ports that are connected to outside networks, respectively;
a network interface port connected to each of the input/output ports;
a packet converter connected to the network interface port; and
a hub connecting packet converters corresponding to respective ones of the input/output ports,
wherein
the network interface port comprises:
a packet memory for storing an input packet signal received from a corresponding input/output port; and
a first determiner for determining whether the input packet signal is an MAC (media access control) frame signal, to output a determination result and the input packet signal to the packet converter, and
the packet converter comprises:
a LCH (local channel) header generator for generating a local channel header when it is determined that the input packet signal is not the MAC frame signal;
a LCH packet combiner for combining the local channel header and the input packet signal to produce a local channel packet signal to be sent to the hub, wherein a form of the local channel packet signal is identical to the MAC frame signal and a content of a predetermined portion of the local channel packet signal is different from a counterpart of any MAC frame signal;
a second determiner for determining whether an output packet signal is a local channel packet signal; and
a local packet checker for reproducing a packet signal conforming to a corresponding network from the output packet signal when the output packet signal is a local channel packet signal, wherein, when the output packet signal is an MAC frame signal, the output packet signal is output as it is to the corresponding network,
wherein the predetermined portion of the local channel packet signal corresponding to a source address of the MAC frame signal is set to a unique bit string that is not used in the MAC frame signal.

4. The network interconnection system according to claim 3, wherein the predetermined portion of the local channel packet signal corresponding to a source address of the MAC frame signal is set to all 0s.

5. A method for connecting a plurality of networks to each other through a switch having a plurality of input and output ports, comprising the steps of:
storing an input packet signal received from an input port corresponding to a network;
determining whether the input packet signal is an MAC (media access control) frame signal;
when it is determined that the input packet signal is not an MAC frame signal, generating a local channel header based on a destination of the input packet signal;
combining the local channel header and the input packet signal to produce a local channel packet signal, wherein a form of the local channel packet signal is identical to the MAC frame signal and a content of a predetermined portion of the local channel packet signal is different from a counterpart of any MAC frame signal;
forwarding the local channel packet signal to a destination output port; and
when it is determined that the input packet signal is an MAC frame signal, forwarding the input packet signal as it is to a destination output port,
wherein the predetermined portion of the local channel packet signal corresponding to a source address of the MAC frame signal is set to a unique bit string that is not used in MAC frame format,
wherein the predetermined portion of the local channel packet signal corresponding to a source address of the MAC frame signal is set to all 0s.

6. The method according to claim 5, further comprising the steps of:
determining whether an output packet signal is a local channel packet signal;
when the output packet signal is a local channel packet signal, reproducing a packet signal conforming to a corresponding network from the output packet signal; and
when the output packet signal is an MAC frame signal, outputting the output packet signal as it is to the corresponding network.

* * * * *